United States Patent [19]
Kaneko et al.

[11] Patent Number: 5,603,655
[45] Date of Patent: Feb. 18, 1997

[54] METHOD AND APPARATUS FOR WORKING ON A WORKPIECE, USING FOAMED WORKING LIQUID IN AREA OF CONTACT BETWEEN THE WORKPIECE AND WORKING TOOL

[75] Inventors: Shinobu Kaneko; Minoru Haga; Hisatoshi Yoshida; Katsuhiro Mori, all of Toyota, Japan

[73] Assignee: Toyota Jidosha Kabushiki Kaisha, Japan

[21] Appl. No.: 354,096

[22] Filed: Dec. 6, 1994

Related U.S. Application Data

[62] Division of Ser. No. 957,554, Oct. 8, 1992.

[51] Int. Cl.$^6$ ........................................ B24B 55/02
[52] U.S. Cl. ......................... 451/450; 451/488; 451/53
[58] Field of Search ...................... 451/450, 488, 451/28, 61, 36, 37, 53, 54

[56] References Cited

U.S. PATENT DOCUMENTS

| | | | |
|---|---|---|---|
| 3,547,350 | 12/1970 | Marcoux | 451/488 |
| 3,583,383 | 6/1971 | Ovshinsky | 451/488 |
| 3,618,709 | 11/1971 | Boelkins . | |
| 3,756,348 | 9/1973 | Lizumi . | |
| 5,129,190 | 7/1992 | Kovach et al. | 451/488 |

FOREIGN PATENT DOCUMENTS

| | | |
|---|---|---|
| 77252/87 | 8/1987 | Australia . |
| 60-186317 | 9/1985 | Japan . |
| 61-44765 | 12/1986 | Japan . |
| 63-97439 | 6/1988 | Japan . |
| 412970 | 6/1974 | U.S.S.R. . |

OTHER PUBLICATIONS

Metalworking Production "Foam Cutting Lubricant is Sprayed On" (Feb. 1977) vol. 121, No. 2.
Australian Examiner's Report.
Metalworking Production vol. 121, No. 2, Feb. 1977, London GB p. 27.
European Search Report.
"Basic Investigation on Grooving Wear", Ohno et al, Japanese.
Precision Machine Association, Precision Machine, vol. 41, No. 3, Mar. 1975, pp. 85–91.

*Primary Examiner*—Robert A. Rose
*Attorney, Agent, or Firm*—Finnegan, Henderson, Farabow, Garrett & Dunner, L.L.P.

[57] ABSTRACT

A method and apparatus for physically processing a workpiece by contact of a working tool with the workpiece, wherein a mass of bubbles of a working liquid is applied to an area of contact between said working tool and said workpiece. The apparatus includes a foaming device for foaming the working liquid to produce the mass of bubbles, a conduit for delivering the mass of bubbles from the foaming device, and a nozzle disposed at one end of the conduit remote from the foaming device, for applying the mass of bubbles to at least one of the tool and workpiece. The nozzle may incorporates a foaming device.

18 Claims, 10 Drawing Sheets

METHOD AND APPARATUS FOR WORKING ON A WORKPIECE, USING FOAMED WORKING LIQUID IN AREA OF CONTACT BETWEEN THE WORKPIECE AND WORKING TOOL

This is a division of application Ser. No. 07/957,554, filed Oct. 8, 1992.

BACKGROUND OF THE INVENTION

1. Field of the Invention

The present invention relates in general to a method and an apparatus for machining, grinding, plastic working and other physical working operations performed on a workpiece, and more particularly to a technique relating to the use or application of a cutting or working liquid in such working method and apparatus.

2. Discussion of the Prior Art

An operation to physically process a workpiece by a working tool is effected with or without application of a working liquid such as a cutting liquid or coolant to a working area of the workpiece and tool. An operation without using the working liquid is sometimes called "dry" working, which is employed, for example, when the workpiece is ground, or when a brittle material such as a cast iron is machined. In this case, the cutting chips produced may be scattered around the working apparatus or machine, and the working environments are deteriorated.

An operation using the working liquid is sometimes called "wet" working, which is performed while the working liquid is applied to the working area which includes the point of contact between the working tool and the workpiece. The working liquid may be an oil, or an aqueous solution or suspension of a coolant and/or a lubricant. The function of the working liquid is to prevent scattering of the cutting chips produced during cutting, grinding or other working operation, to cool the working tool and workpiece which are heated by friction, and to lubricate the tool and workpiece for lowering the frictional resistance.

The conventional "wet" working method and apparatus suffer from several drawbacks as described below.

First, the working liquid which usually flows through the working area should be continuously fed throughout a working operation. Further, a large volume of the working liquid is necessary to prevent the scattering of the cutting chips, particularly for a grinding operation, or a machining operation on a brittle material such as a cast iron. This requires a large sized device for delivering the working fluid, and accordingly increases the working cost.

On the other hand, the working liquid or coolant has a larger cooling capacity than the ambient air, and may cause a sudden drop of the operating temperature of the working tool. As a result, the working tool undergoes temperature changes due to the heating by friction and the cooling by the working liquid, and is therefore susceptible to thermal cracking or damage, which may deteriorate the working accuracy, and shorten the service life of the working tool.

Where the wet working operation such as a form rolling, broaching or tapping operation requires the use of a comparatively expensive working liquid such as an oil, or an aqueous working liquid having a high concentration, the consumption of the working liquid results in a significant increase in the working cost. The working liquid is consumed because it is transferred to the machined or otherwise processed workpiece, and may be disposed of with the cutting chips.

SUMMARY OF THE INVENTION

It is therefore a first object of the present invention to provide a method of physically processing a workpiece by contact of a working tool with the workpiece, which method is substantially free from the drawbacks described above.

It is a second object of the invention to provide an apparatus suitable for practicing the method indicated above.

The first object may be achieved according to a first aspect of this invention, which provides a method of physically processing a workpiece by contact of a working tool with the workpiece, the method being characterized in that a mass from bubbles of a working liquid is applied to an area of contact between the working tool and the workpiece.

The bubbles of the working liquid have a higher degree of adherence to the working tool and workpiece than the liquid per se. This fact makes it possible to reduce the required amount of the working liquid. That is, the mass of the bubbles adhering to the surfaces of the tool and workpiece is relatively slowly supplied to the area of contact between the tool and the workpiece, and is therefore able to effectively cool and lubricate the tool and workpiece, without a continuous feeding of a large volume of the liquid as required in the conventional method.

Since the required amount of the working liquid is comparatively small due to the application of the liquid in the form of bubbles, the amount of the liquid that is inevitably consumed as a waste-either transferred to the processed workpiece or adhered to the cutting chip-is accordingly reduced, whereby the working cost is lowered, even if an expensive oil or high-concentration aqueous solution is used.

Further, the cutting chips produced during a grinding operation, or a machining operation on a cast iron or other brittle material are effectively trapped by the bubbles of the working liquid applied to the working area, and thereby prevented from being scattered around the working apparatus.

Since each bubble or vesicle of the working liquid is filled with a gaseous phase such as air or inert gas, the mass of the bubbles has a lower cooling capacity than the liquid per se, and will not cause a sudden or rapid drop of the temperature of the working tool. The, the thermal conductivity of the bubbles is lower than that of the liquid itself. It is also appreciated that as the temperature of the working tool rises, the liquid phase of the bubbles adhering to the surface of the tool is vaporized, and the gaseous phase (e.g., air or inert gas) contained in the bubbles covers the surface of the tool, so as to prevent rapid cooling of the tool.

As explained above, the use of the foamed working liquid or the application of the liquid in the form of bubbles makes it possible to reduce the required amount of the working liquid, thereby lowering the working cost.

The mass of bubbles of the working liquid prevents the scattering of the cutting chips produced during a grinding operation, or a machining of a cast iron or other brittle material, thereby improving the working environment.

Further, the present working method assures freedom of the working tool from thermal cracking, thus assuring improved working accuracy and prolonged life expectancy of the working tool.

The second object may be achieved according to one feature of a second aspect of the present invention, which provides an apparatus for physically processing a workpiece by contact of a working tool with the workpiece, the apparatus comprising: (a) a tool holder for holding the working tool; (b) a work holder for holding the workpiece; (c) a foaming device for foaming a working liquid to produce a mass of bubbles; (d) a conduit for delivering the mass of bubbles from the foaming device; and (e) a nozzle disposed at one end of the conduit remote from the foaming device, for applying the mass of bubbles to at least one of the working tool and the workpiece.

According to the above feature of the invention, the foaming device may be adapted to include a container for accommodating the working liquid, and an agitating device for agitating the working liquid, so as to produce the mass of bubbles in a space above a surface of the working liquid within the container. The agitating device may be replaced by a porous member disposed below a surface of the working liquid within the container, and a device for blowing a gas into the container through the porous member.

The second object may also be achieved according to another feature of the second aspect of this invention, which provides an apparatus for physically processing a workpiece by contact of a working tool with the workpiece, the apparatus comprising: (a) a tool holder for holding the working tool; (b) a work holder for holding the workpiece; (c) a gas passage; (d) a gas supply device for providing a flow of a gas through the gas passage; (e) a porous member disposed such that a portion of the gas passage is filled with the porous member; and (f) a soaking device for soaking the porous member with a working liquid, the soaking device cooperating with the gas supply device and the porous member, to produce a mass of bubbles from the working liquid on one side of the porous member remote from the gas supply device.

The second object may also be achieved according to a further feature of the second aspect of this invention, which provides an apparatus for physically processing a workpiece by contact of a working tool with the workpiece, the apparatus comprising: (a) a tool holder for holding the working tool; (b) a work holder for holding the workpiece; (c) a pressure vessel for accommodating a working liquid under pressure; (d) a carbon dioxide supply device for introducing carbon dioxide into the pressure vessel, so that the carbon dioxide is dissolved in the working liquid; (e) a conduit for delivering the working liquid with the carbon dioxide dissolved therein, to at least one of the working tool and the workpiece; and (f) valve means disposed in the conduit, and having a first state and a second state for inhibiting and allowing the delivery of the working liquid from the pressure vessel, respectively.

The second object may also be achieved according to a still further feature of the second aspect of this invention, which provides an apparatus for physically processing a workpiece by contact of a working tool with said workpiece, comprising: (a) a tool holder for holding the working tool; (b) a work holder for holding the workpiece; (c) a gas supply device for providing a flow of an inert gas; (d) a liquid supply device for providing a flow of a working liquid; and (e) a foaming device receiving the flows of the inert gas and the working liquid, for thereby foaming the working liquid to produce a mass of bubbles from the liquid to be applied to at least one of the working tool and the workpiece. The inert gas contained in the mass of bubbles effectively protects the workpiece and working tool against oxidation or other chemical reaction at an elevated temperature caused by the heat generated during the processing of the workpiece. The inert gas is preferably argon or other rare gas such as helium.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
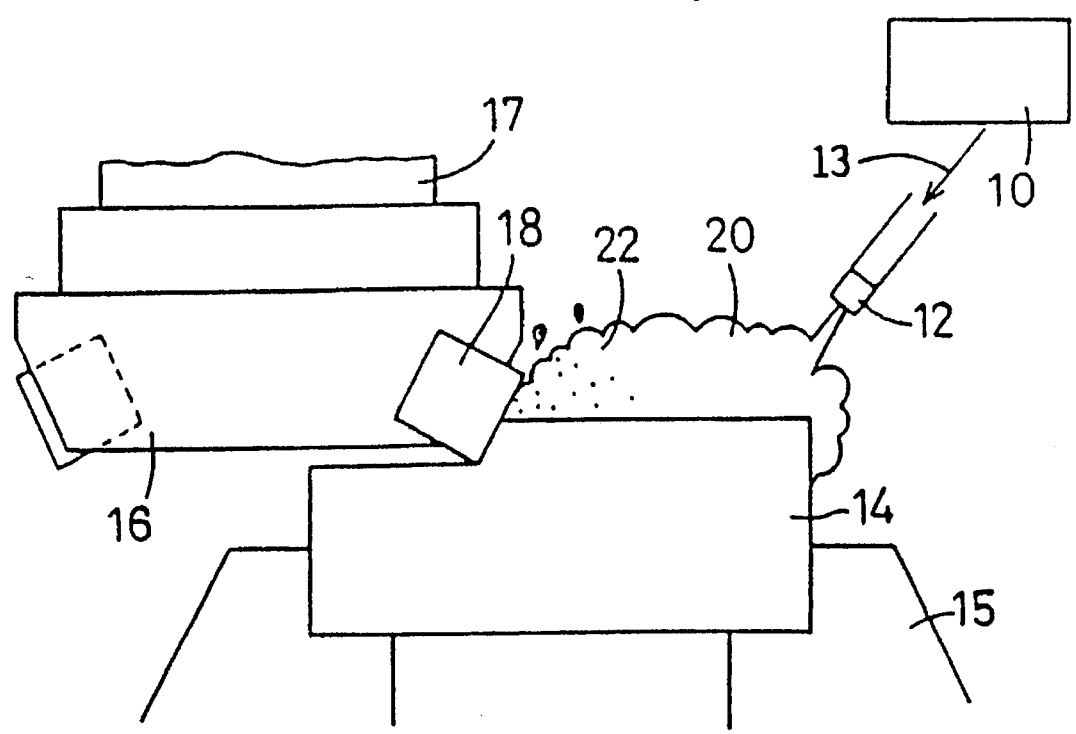
FIG. 1 is a fragmentary front elevational view of a milling apparatus according to one embodiment of this invention.

Referring first to FIG. 1, the milling apparatus has a chucking device 15 for clamping a workpiece 14 made of a cast iron, and a spindle 17 to which is attached a working tool in the form of a milling cutter 16. The milling cutter 16 has a plurality of cutting blades or inserts 18 for milling the workpiece 14. To effect a milling operation on the workpiece 14, the milling cutter 16 is rotated by the spindle 17, while the workpiece 14 and the cutter 16 are fed relative to each other in a plane perpendicular to the axis of rotation of the cutter, namely, in the horizontal plane.

The milling apparatus is provided with a foaming device 10 for applying a foamed cutting liquid to a portion of the workpiece 14 under milling, more precisely, to an area of contact between the workpiece 14 and the milling cutter 16 (cutting blades or inserts 18). The foamed cutting liquid is fed from the foaming device 10 to a nozzle 12 through a suitable conduit 13, as needed. The nozzle 12 is positioned so as to direct a mass of bubbles 20 of the liquid to the area of contact of the workpiece and cutter 14, 16. With the mass of bubbles 20 covering the portion of the workpiece 14 under milling, cutting chips 22 of cast iron produced by the cutting inserts 18 are trapped by or caught in the mass of bubbles 20, whereby the scattering of the chips 22 is prevented.

Figure 2:
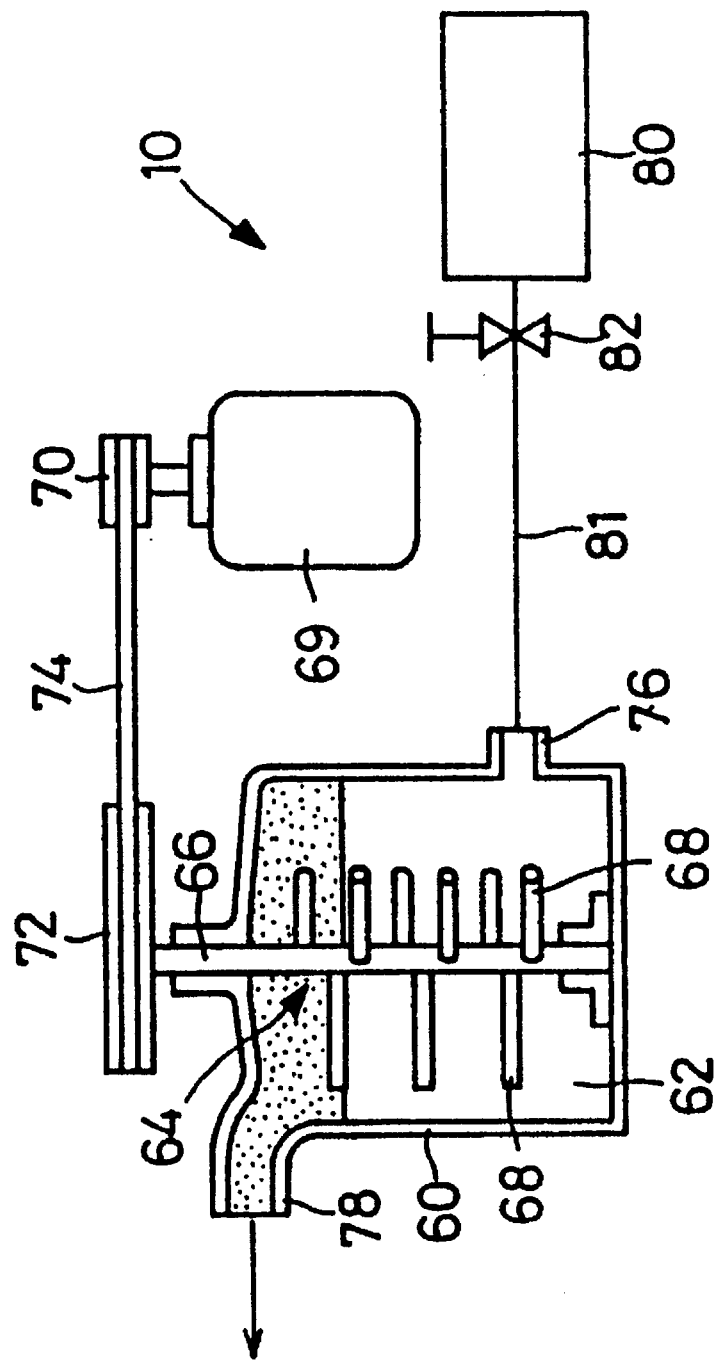
FIG. 2 is a front elevational view partly in cross section of one example of a foaming device used in the milling apparatus of FIG. 1.

Referring next to FIG. 2, there is illustrated an example of the foaming device 10 used in the milling apparatus of FIG. 1. The device 10 has a container 60 which contains a cutting liquid 62, which is a water-soluble coolant-lubricant diluted by water by 5–30 times, for example, so that the concentration of the coolant-lubricant is adjusted to meet particular requirements such as the desired liquid amount of the produced bubbles with respect to the size of the bubbles, and the expected life (time before extinction or burst) of the bubbles. Within the container 60, there is rotatably supported a stirrer 64 which includes a drive shaft 66, and a plurality of blades 68 which are secured to the shaft 66 such that the blades 68 extends in a radial direction from the shaft 66 and are spaced apart from each other in the axial direction of the shaft 66. The drive shaft 66 is rotated by a motor 69, through a pulley 70 rotating with the output shaft of the motor 69, a pulley 72 connected to an upper end of the shaft 66, and a belt 74 connecting the two pulleys 70, 72.

The container 60 has an air inlet 76 and an outlet 78. The air inlet 76 is connected to a compressed air source 80 through a conduit 81 provided with a valve 82. The cutting liquid 62 in the container 60 is foamed or bubbled by agitation of the liquid 62 by rotation of the stirrer 64 while air is blown into the container 60 through the air inlet 76. Thus, the foamed liquid 62 is delivered through the outlet 78, and is supplied through the nozzle 12, in the form of the mass of bubbles 20, to the area of contact between the workpiece 14 and the cutter 16, as shown in FIG. 1. For improved foamability, the cutting liquid 62 does not include a de-foaming agent, which is usually added to an ordinary cutting liquid, for preventing the liquid from being foamed.

Since the mass of bubbles 20 has a smaller cooling capacity than the cutting liquid 62 per se, a sudden drop of the temperature of the cutting inserts 18 can be avoided, to thereby increase the expected life of the cutter 16 and improve the milling accuracy of the workpiece 14.

Since the cutting liquid 62 is foamed before it is applied to the area of contact of the workpiece 14 and cutter 16, the area of contact can be suitably lubricated by a reduced amount of the liquid 62, and therefore at a reduced cost. The reduction in the required amount of the cutting liquid 62 makes it possible to reduce the size of the foaming device 10 and nozzle 12, as compared with a known coolant supply device. In this respect, too, the overall cost of manufacture and the running cost of the milling apparatus are reduced.

It is also appreciated that the liquid 62 which remains on the workpiece 14 after the milling operation will easily evaporate by the heat of the workpiece 14, since the amount of the liquid 62 which form the bubbles 20 is considerably small. Accordingly, it is not necessary to wipe off the residual liquid 62 on the workpiece 14.

It will be understood that the foaming device 10 uses the agitating device 64, 68, 70, 72, 74 which is disposed outside and connected to the nozzle 12. However, the foaming device 10 may be replaced by a foaming device 29 as used in a second embodiment of the present invention shown in FIG. 3.

Figure 3:
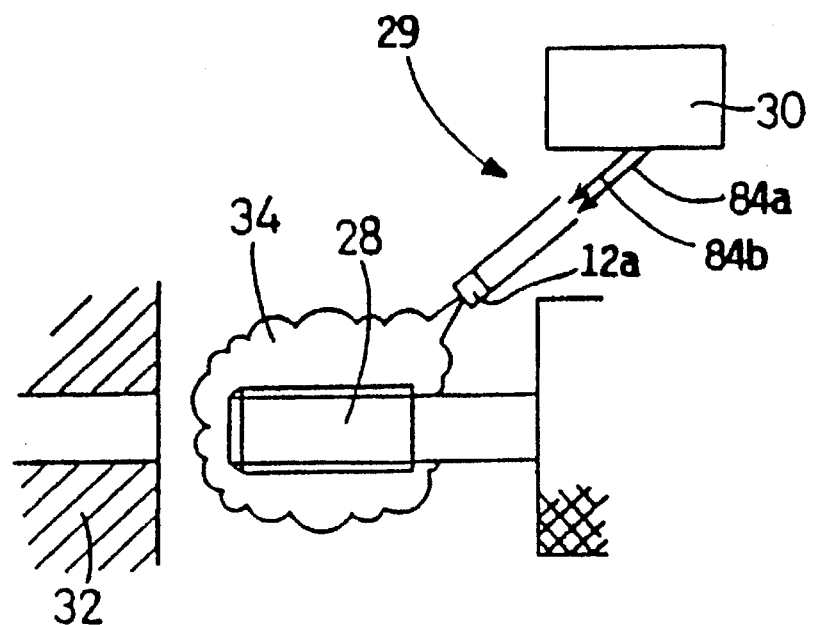
FIG. 3 is a fragmentary front elevational view of a tapping apparatus according to another embodiment of the present invention.

The second embodiment of FIG. 3 takes the form of a tapping apparatus adapted to tapping a hole formed in a workpiece 32, by using a tapping tool 28. Prior to a tapping operation, the tool 28 is covered by a mass of bubbles 34 of a cutting liquid supplied from the foaming device 29. As the tapping tool 28 is fed into the hole in the workpiece 32, the cutting liquid of the bubbles 34 is supplied to the portion of the tool 28 which engages the hole, that is, to the area of contact between the cutting edge of the tool 28 and the inner surface of the hole being tapped.

Figure 4:
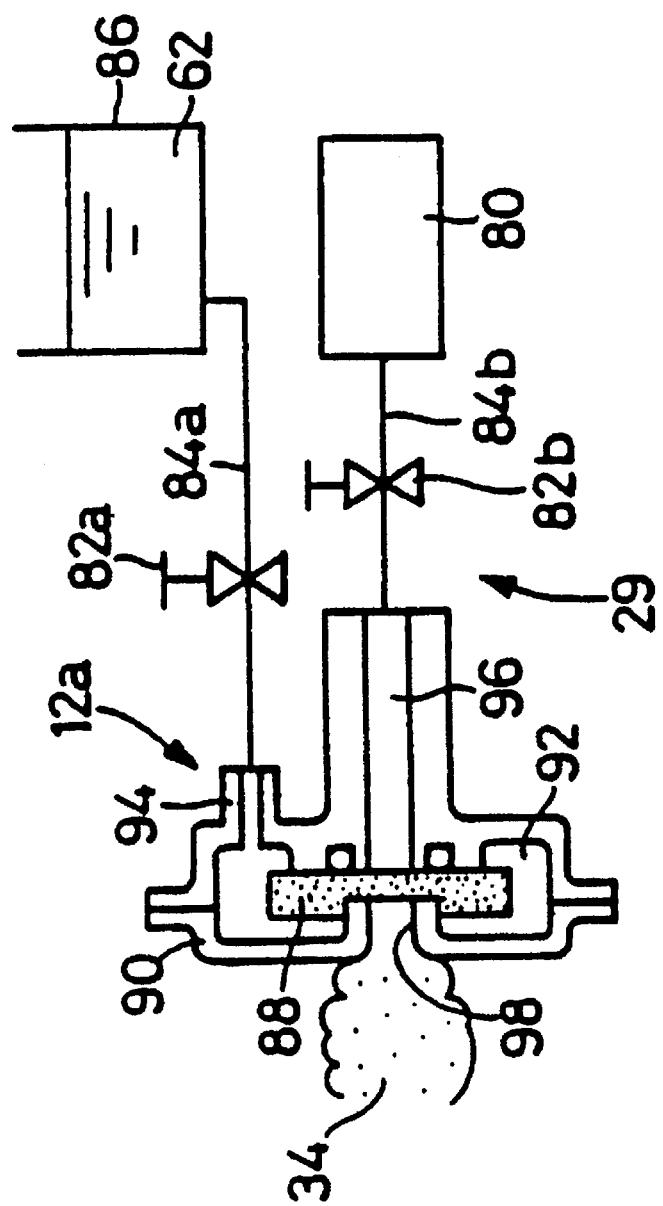
FIG. 4 is an elevational view partly in cross section of one example of a foaming device used in the tapping apparatus of FIG. 3.

The foaming device 29 includes a liquid-air supply 30, and a foaming nozzle 12a connected to the liquid-air supply 30 through conduits 84a, 84b. As shown in FIG. 4, the liquid-air supply 30 consists of a liquid reservoir 86 connected to the foaming nozzle 12a through the conduit 84a provided with a valve 82a, and the compressed air source 80 connected to the nozzle 12a through the conduit 84b provided with a valve 82b. The foaming nozzle 12a functions not only as a nozzle, but also as a foaming unit for foaming the cutting liquid 62 fed from the liquid reservoir 86, while air is blown into the nozzle 12a.

Described more specifically, the foaming nozzle 12a has a disk-like porous member 88 fixed in a housing body 90 such that a radially outer portion of the porous member 88 is exposed to an annular liquid chamber 92, which is defined by the walls of the housing body 90 and the porous member 88. The housing body 90 has a liquid inlet 94 to which the conduit 84a is connected. The liquid chamber 92 is filled with the cutting liquid 62 introduced through the inlet 94, so that the porous structure of the porous member 88 is soaked with the liquid 62. Thus, the conduit 84a (with the valve 82a), reservoir 86 and housing 90 (annular chamber 92) constitutes a soaking device for soaking the porous member 88 with the liquid 62.

The housing body 90 has an air passage 96 in the form of a center hole which is connected at one end thereof to the conduit 84b to receive a flow of the air from the air source 80, and which has a nozzle portion at the opposite end 98. A portion of the air passage 96 is filled with a central portion of the disk-like porous member 88, so that the air stream through the porous member 88 causes the mass of the liquid 62 in the porous member 88 to be foamed as the mass of bubbles 34 at the nozzle portion 98 on the outlet side of the porous member 88. The size of the bubbles 34 can be adjusted by suitably changing the concentration of the coolant-lubricant of the cutting liquid 62, and the pore size of the porous member 88. Further, the amount of the liquid 62 of the bubbles 34 with respect to the amount of the air can be changed by adjusting the rate of flow of the air introduced into the foaming nozzle 12a from the air source 80.

The bubbles 34 adhering to the tapping tool 28 and workpiece 32 break or burst in a comparatively short time, and the mass of the bubbles 34 remaining on the tool and workpiece 28, 32 after the tapping operation is relatively small. Thus, the residual mass of bubbles 34 and the cutting chips can be readily removed by a suitable vacuum cleaner.

Since the foamed liquid 62 or the mass of bubbles 34 has a high degree of adhesion to the tapping tool 28, a single application of the mass of bubbles 34 to the tool 28 prior to the tapping operation is sufficient, and the foaming device 29 need not be operated throughout the tapping operation.

Since the amount of the cutting liquid 62 required by the present tapping apparatus is considerably small, it is not necessary to reclaim the used liquid and return the liquid to the reservoir 62 through a filter or strainer. Therefore, the tapping apparatus does not require devices for recirculating and filtering the used liquid, and is available at an accordingly reduced cost.

Figure 5:
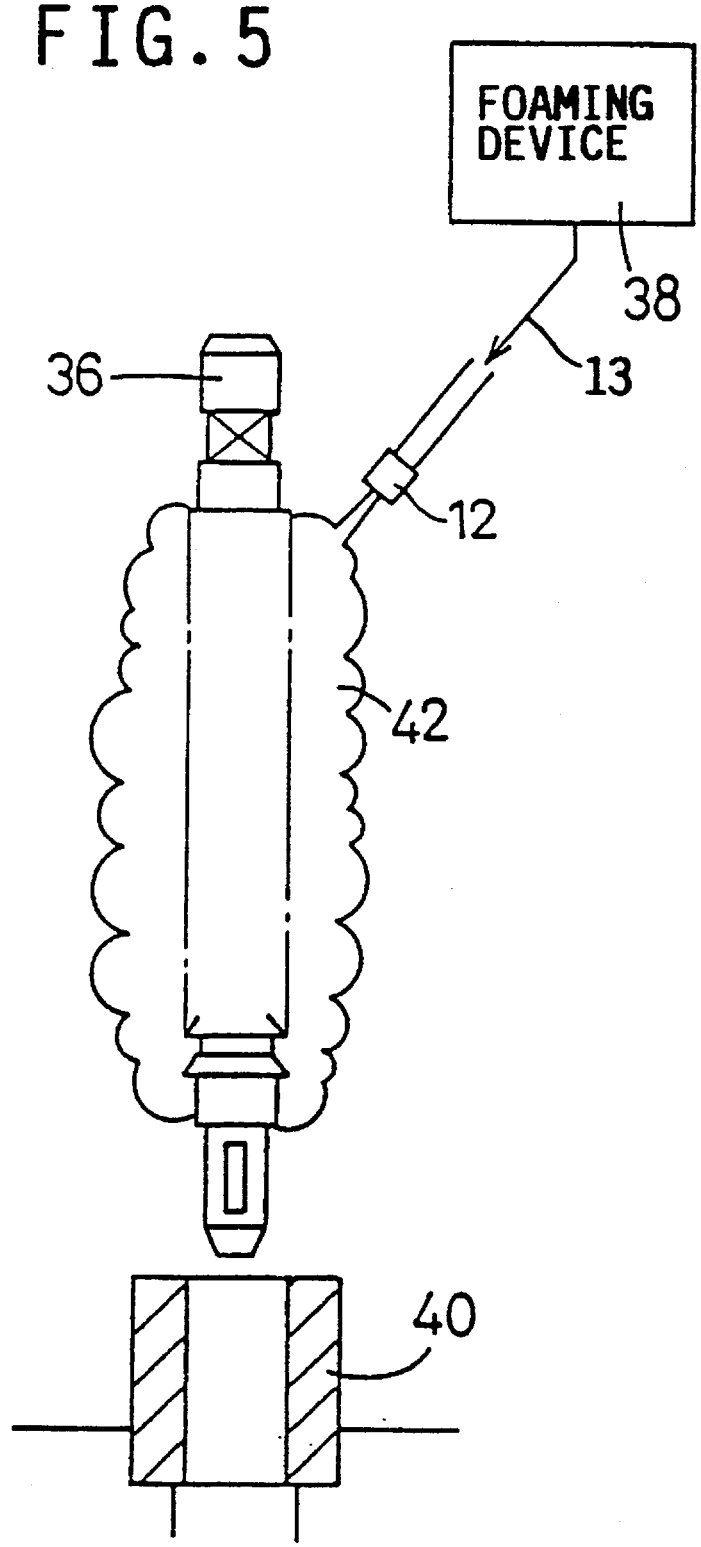
FIG. 5 is a fragmentary front elevational view partly in cross section of a broaching apparatus according to a further embodiment of the invention.
Figure 6:
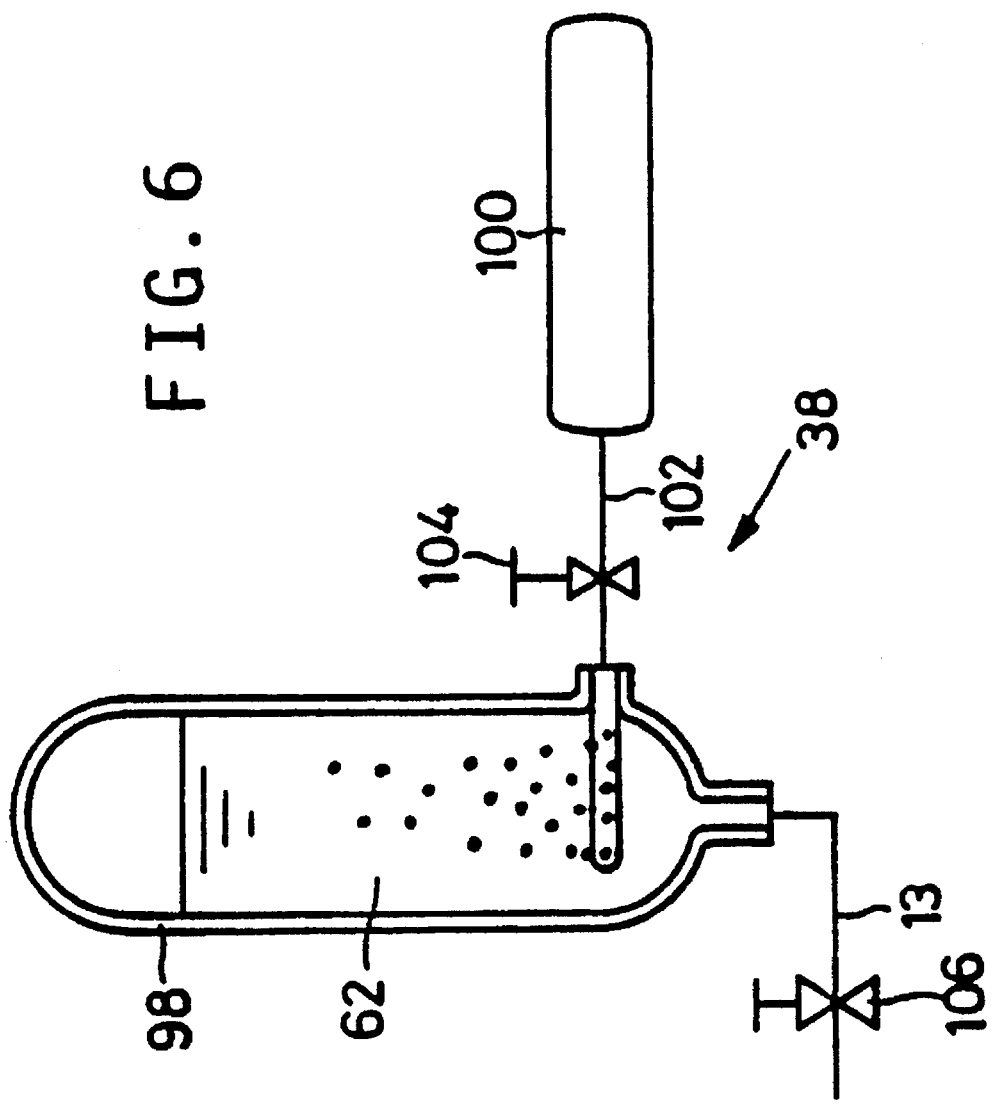
FIG. 6 is an elevational view in cross section of an example of a foaming device used in the broaching apparatus of FIG. 5.

Referring next to FIG. 5, there will be described a third embodiment of the present invention as applied to a broaching apparatus. As in the tapping apparatus described above, a broaching tool 36 is coated with a mass of bubbles 42 foamed from the cutting liquid 62, prior to a broaching operation of the tool 36 on a workpiece 40. The broaching apparatus uses a foaming device 38, which is illustrated in FIG. 6.

The foaming device 38 includes a pressure vessel or container 98 in which the cutting liquid 62 having a high concentration of the coolant-lubricant is stored under pressure. The pressurized liquid 62 is saturated with carbon dioxide dissolved therein. The carbon dioxide is introduced from a pressure vessel 100 through a conduit 102 provided with a valve 104. The pressure vessel 98 is connected to the nozzle 12 through a solenoid-operated valve 106. Before each broaching operation, the solenoid-operated valve 106 is opened to feed a suitable volume of the pressurized liquid 62 to the nozzle 12, at which the pressurized liquid 62 is de-pressurized under the atmospheric pressure and is thus foamed into the mass of bubbles 42 with which the broaching tool 36 is coated. With the valve 106 in the closed position, the delivery of the liquid 62 from the vessel 98 is inhibited.

Figure 7:
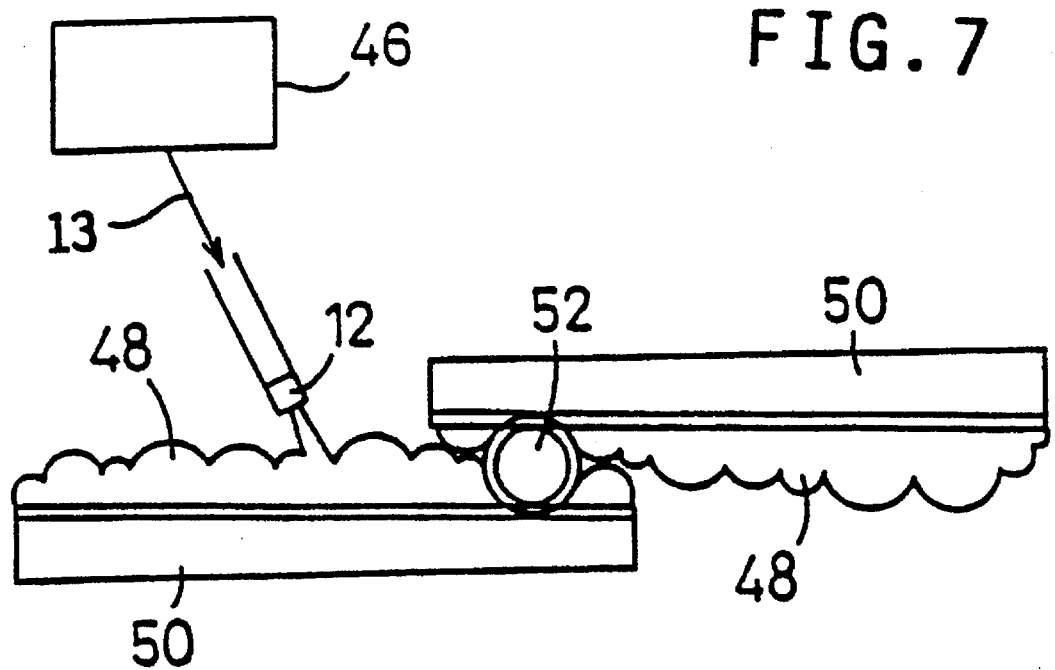
FIG. 7 is a front elevational view of a form rolling apparatus according to a still further embodiment of this invention.

The principle of the present invention is also applicable to a form rolling apparatus as shown in FIG. 7, which does not produce cutting chips, unlike the milling, tapping and broaching apparatuses illustrated above. The form rolling apparatus uses a foaming device 46 for applying a mass of bubbles 48 of a working liquid 62 to rolling dies 50, 50 and workpiece 52, for the purpose of cooling and lubricating the dies and workpiece 50, 52 to prevent seizure of the dies 50 and increase the expected life of the dies.

Figure 8:
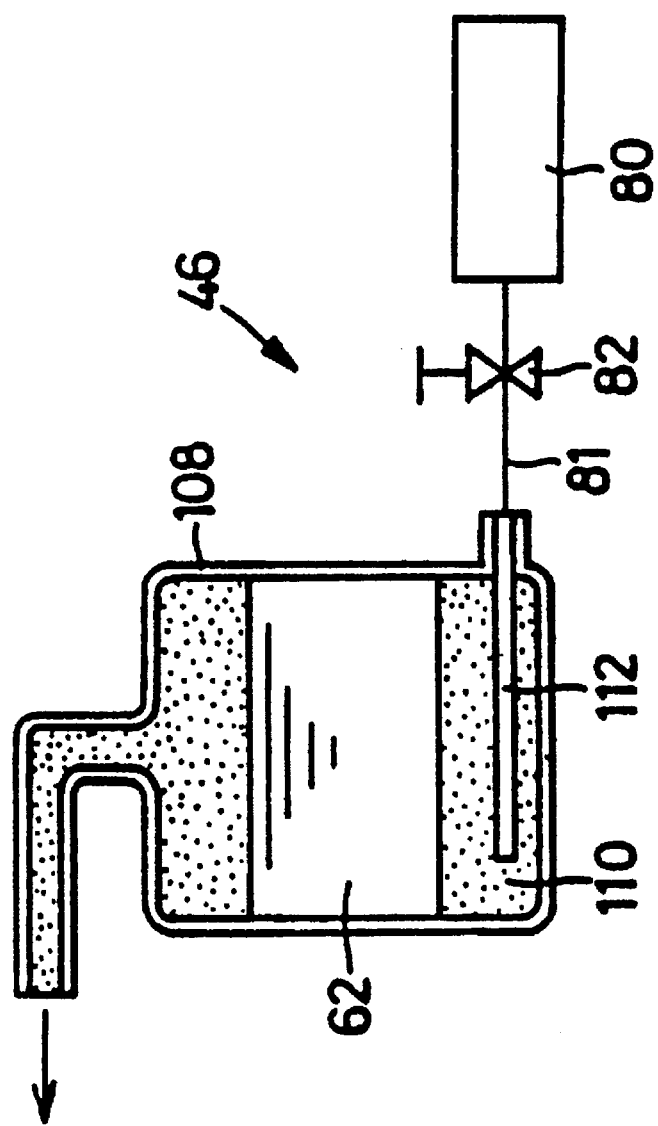
FIG. 8 is an elevational view partly in cross section of a foaming device used in the form rolling apparatus of FIG. 7.

As shown in FIG. 8, the foaming device 46 has a liquid reservoir 108 in which the working liquid 62 is accommodated. The reservoir 108 is provided with a porous member 110 disposed in its bottom portion. The pores in the porous member 110 are filled with the liquid 62. The porous member 110 has an array of radial air passages 112 which is connected to the air source 80 through the conduit 81, so that air is blown into the porous member 110 through the radial air passage array 112. When the air is blown into the porous member 110, bubbles are produced on the surface of the volume of the liquid 62 in the reservoir 108, and the mass of bubbles 42 is supplied to the nozzle 12 through the conduit 13 as shown in FIG. 7.

Figure 9:
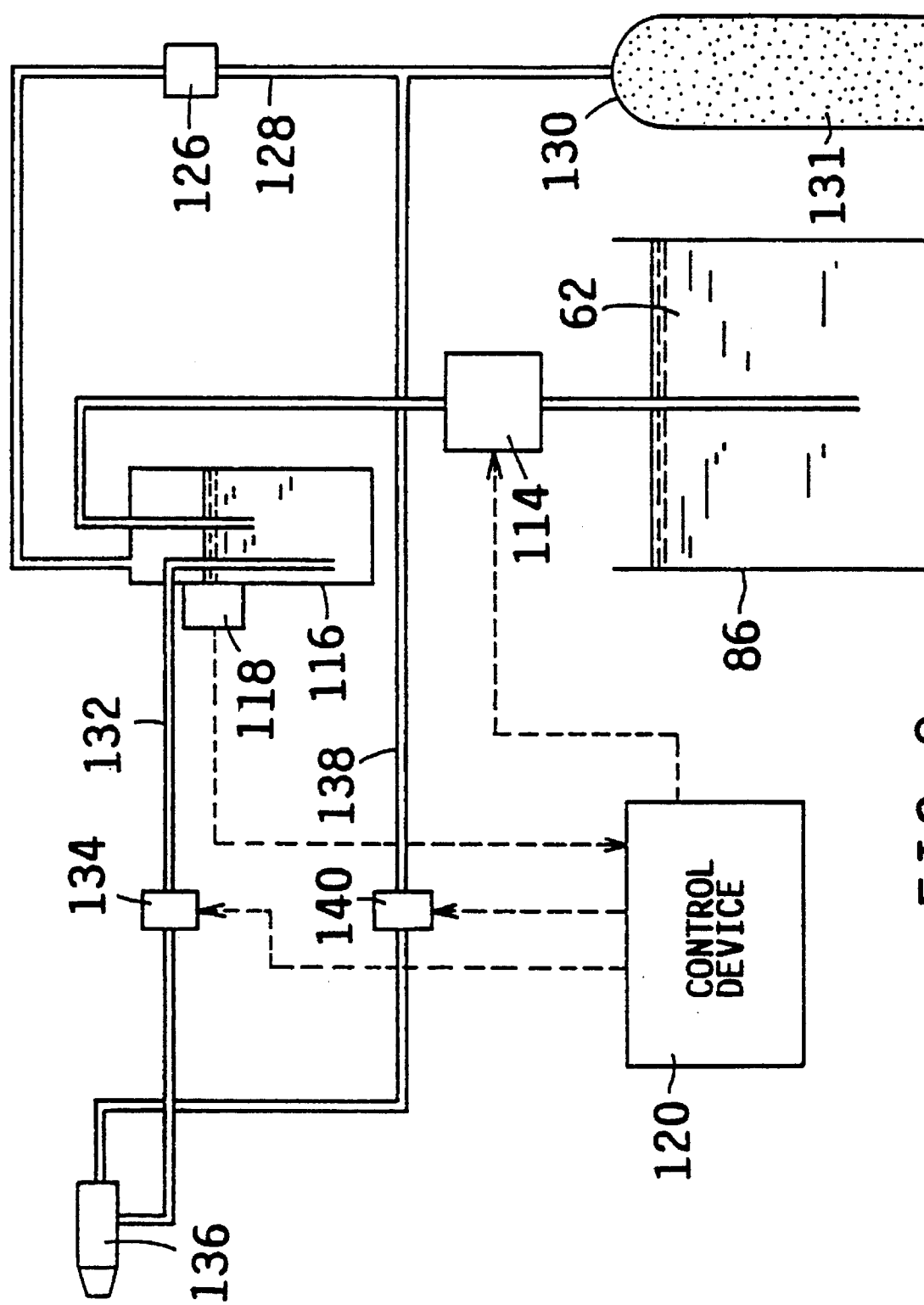
FIG. 9 is a schematic view illustrating an arrangement for foaming a cutting liquid using an inert gas, used in a further embodiment of this invention.
Figure 10:
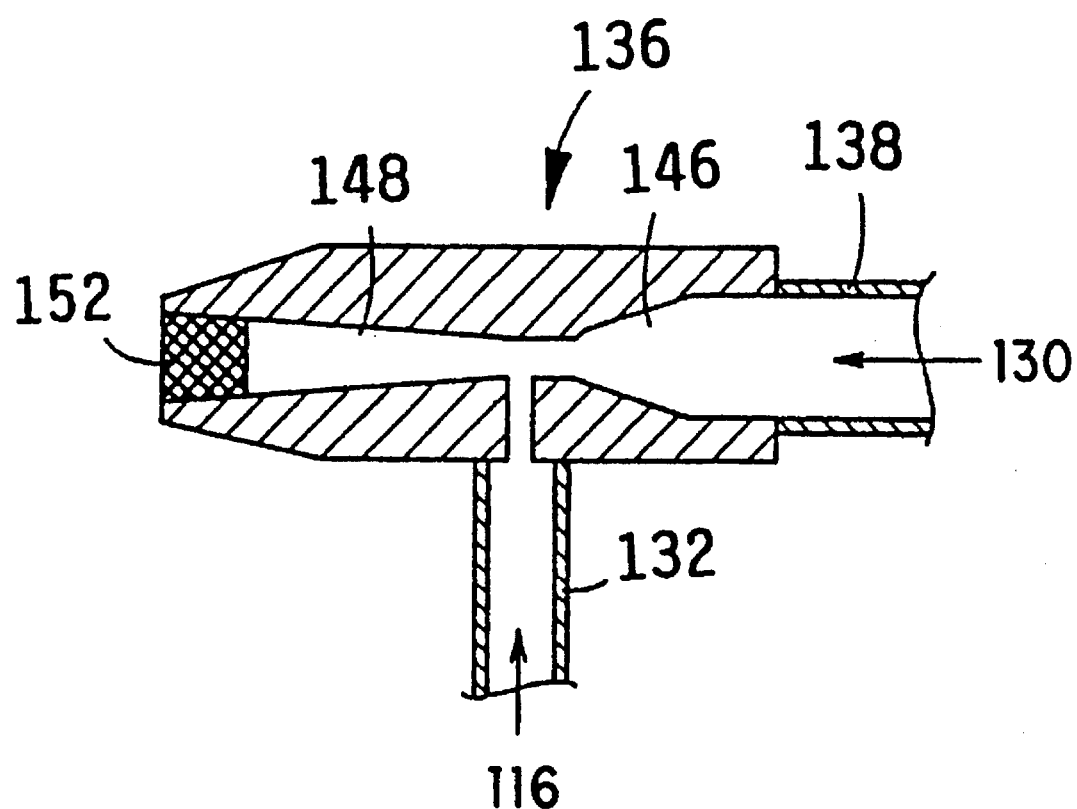
FIG. 10 is an elevational view in cross section of a foaming head used in the embodiment of FIG. 9.
Figure 11:
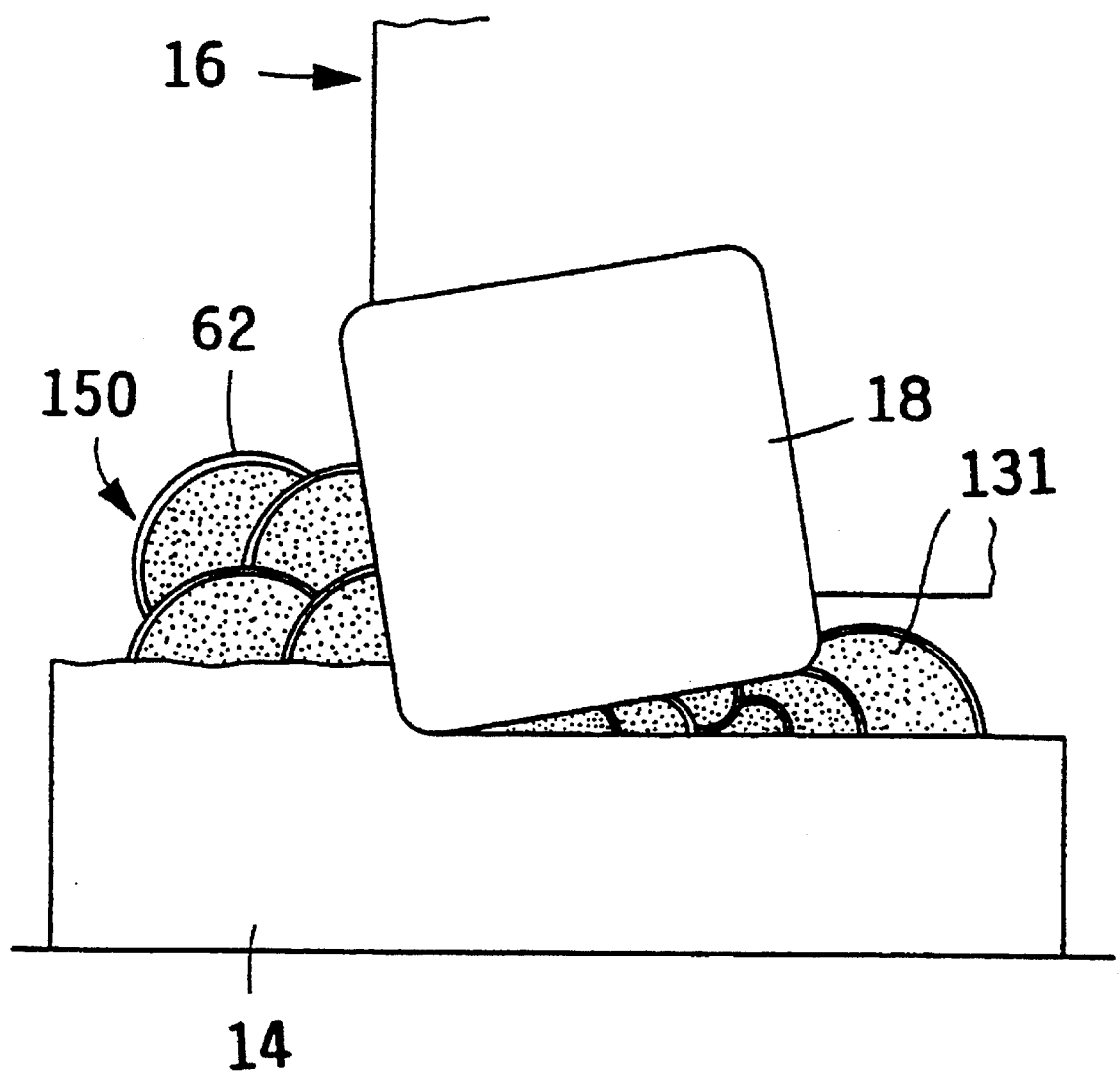
FIG. 11 is a fragmentary elevational view showing an example of application of the foaming head of FIG. 10 to a milling apparatus as shown in FIG. 1.

Referring next to FIGS. 9–11, there will be described a further embodiment of the present invention, in which a mass of bubbles of a cutting liquid is produced by using an inert gas.

In the present embodiment, the aqueous cutting liquid 62 contained in the liquid reservoir 86 as used in the embodiment of FIG. 4 is pumped up by a pump 114, and is fed to a pressure vessel 116. The level of the liquid 62 in the vessel 116 is detected by a level sensor 118. The output of this level sensor 118 is received by a control device 120, which controls the pump 114 in response to the output of the level sensor 118, so that the level of the liquid 62 in the vessel 116 is maintained within a predetermined range.

A pressure vessel 130 which stores a rare gas in the form of argon 131 under pressure is connected to the pressure vessel 116, through a pressure passage 128 which is open to an upper part of the interior space of the vessel 116. The passage 128 is provided with a pressure regulator 126, so that the pressure of argon 131 as applied to the vessel 116 is regulated to an optimum level.

The liquid 62 stored in the vessel 116 is fed to a foaming head 136 under the pressure of the argon gas 131, through a liquid conduit 132 provided with a control valve 134. The foaming head 136 is connected to or disconnected from the vessel 116 by the control valve 134, which also functions as a variable flow restrictor to adjust the flow of the liquid 62 to the foaming head 136.

The foaming head 136 is connected to the pressure vessel 130 through an argon conduit 138 which is provided with a control valve 140 similar to the control valve 134.

As shown in FIG. 10, the foaming head 136 has a bore consisting of a rear nozzle portion 146 and a front diffuser portion 148. The nozzle portion 146 and the diffuser portion 148 are tapered such that the diameter of the rear portion 146 continuously decreases from the rear toward the front end, while the diameter of the diffuser portion 148 continuously increases from the rear toward the front end. Thus, the bore 146, 148 has a varying cross sectional area defined by the varying diameter.

The argon conduit 138 is connected to the rear end of the nozzle portion 146, while the liquid conduit 132 is connected to the rear end of the diffuser portion 148. Since the rate of flow of the argon gas 131 is maximum at the rear end of the diffuser portion 148, the liquid 62 supplied through the conduit 132 is suitably sucked into the diffuser portion 148, whereby the liquid 62 is mixed with the argon gas 131.

Although the liquid 62 is fed into the foaming head 136 under the pressure of the argon gas 131 applied to the pressure vessel 116, the application of the pressure of the argon gas 131 to the vessel 116 through the passage 128 is not essential to assure the intended operation of the foaming head 136.

As a result of mixing of the liquid 62 with the argon gas 131 within the foaming head 136, the liquid 62 is foamed to produce a mass of bubbles 150 as shown in FIG. 11. For facilitating the foaming of the liquid 62, a porous member 152 is disposed in the front end part of the diffuser portion 148. The porous member 152 has a porous structure whose pore size determines the size of the bubbles 150. When the pore size is sufficiently small, the liquid 62 is foamed into a creamy phase.

The pressure regulator 126 is operated by a user to adjust the pressure of the argon gas 130 within the pressure vessel 116. On the other hand, the control valves 134, 140 are automatically operated by the control device 120. For instance, the control device 120 is connected to a main controller for a numerically controlled milling machine adapted for milling the workpiece 14 by the milling cutter 16, as shown in FIG. 11. The main controller controls the control device 120 and other control devices for the machine. The control device 120 operates according to a predetermined program, so as to control the control valves 134, 140, for connection and disconnection of the foaming head 136 to and from the vessels 116, 130, and for adjusting the rates of flow of the liquid 62 and argon gas 131 into the foaming head 136, so as to suitably regulate the amount of the foamed liquid (bubbles) to be delivered from the foaming head 136.

The mass of bubbles 150 thus delivered from the foaming head 136 is applied to an area of contact between the workpiece 14 and the cutter 16 having the cutting chips 18, as indicated in FIG. 11, so that a milling operation is effected, with the cutting blades 18 and the cutting portion of the workpiece 14 being covered by the mass of bubbles 150. The chemically stable argon gas 131 contained in the bubbles 150 protects the workpiece 14 and cutting blades 18 against oxidation or other chemical reactions at an elevated temperature due to the heat generated by the cutting operation. Further, the argon gas 131 per se contributes to reduction in the amount of wear of the cutting blades 18.

While the argon gas 131 is used in the above embodiment to foam the cutting liquid 62, helium or other rare gases, and any other chemically stable inert gases such as nitrogen and carbon dioxide may be used.

Further, an inert gas may be used for the air source 80 in the preceding embodiments, to produce the mass of bubbles 20, 34, 48.

While the various types of foaming devices as applied to the various types of working apparatuses have been described, the use of the specific types of foaming devices is not limited to the specific types of working apparatus illustrated above. Further, other types of foaming devices may be used for the illustrated and other types of working apparatus. It is also noted that the working liquid is not limited to an aqueous solution, but may be a suspension of an oil or oil-containing liquid (coolant-lubricant), or any other forms of a liquid, provided that the working liquid is foamable. The working liquid may contain a suitable additive or additives such as a surface active agent.

Although the preferred embodiments of the invention as applied to the milling, broaching, tapping and form rolling operations have been described with a certain degree of particularity, the principle of the invention is equally applicable to other kinds of working on a workpiece, such as turning (machining on a lathe), boring and other machining operations, ironing and other plastic working operations, and grinding operation. It is to be understood that the present invention may be embodied with various other changes, modifications and improvements, which may occur to those skilled in the art, without departing from the scope of the invention defined in the following claims.

What is claimed is:

1. An apparatus for physically processing a workpiece by contact of a working tool with said workpiece, said apparatus comprising:
   a tool holder for holding said working tool;
   a work holder for holding said workpiece;
   a gas passage;
   a gas supply device for providing a flow of a gas through said gas passage;
   a porous member disposed such that a portion of said gas passage is filled with said porous member; and
   a soaking device for soaking said porous member with a working liquid, said soaking device cooperating with said gas supply device and said porous member, to produce a mass of bubbles of said working liquid on one side of said porous member remote from said gas supply device.

2. An apparatus for physically processing a workpiece by contact of a working tool with said workpiece, said apparatus comprising:
   a tool holder for holding said working tool;
   a work holder for holding said workpiece;
   a pressure vessel for accommodating a working liquid under pressure;
   a carbon dioxide supply device for introducing carbon dioxide into said pressure vessel, so that said carbon dioxide is dissolved in said working liquid;
   a conduit for delivering said working liquid with said carbon dioxide dissolved therein, to at least one of said working tool and said workpiece; and
   valve means disposed in said conduit, and having a first state and a second state for inhibiting and allowing the delivery of said working liquid from said pressure vessel, respectively.

3. An apparatus for physically processing a workpiece by contact of a working tool with said workpiece, comprising:
   a tool holder for holding said working tool;
   a work holder for holding said workpiece;
   a gas supply device for providing a flow of an inert gas;
   a liquid supply device for providing a flow of a working liquid; and
   a foaming device receiving the flows of said inert gas and said working liquid, for thereby foaming said working liquid to produce a mass of bubbles of said liquid to be applied to at least one of said working tool and said workpiece.

4. An apparatus according to claim 3, wherein said foaming device includes a foaming head having a nozzle portion which receives the flow of said inert gas, and a diffuser portion communicating with said nozzle portion and disposed downstream of said nozzle portion, said diffuser portion receiving the flow of said working liquid, so that the flows of the inert gas and working liquid are mixed to produce said mass of bubbles of said liquid.

5. An apparatus according to claim 4, wherein said foaming device further includes a porous member disposed in said diffuser portion through which said mass of bubbles is delivered to at least one of said working tool and said workpiece.

6. An apparatus according to claim 3, wherein said liquid supply device includes a pressure vessel in which said working liquid is stored under pressure.

7. An apparatus according to claim 6, wherein said gas supply device includes another pressure vessel in which said inert gas is stored under pressure, said pressure vessel of said liquid supply device receiving a pressure of said inert gas, to maintain said working liquid under the pressure of said inert gas.

8. An apparatus according to claim 3, wherein said inert gas is argon.

9. An apparatus for delivering a working liquid to at least one of a working tool and a workpiece to be physically processed by contact with said working tool, said apparatus comprising:
   a container for accommodating said working liquid; and
   a foaming device for foaming said working liquid, so as to deliver a mass of bubbles of said working liquid to at least one of said working tool and said workpiece.

10. An apparatus for physically processing a workpiece by contact of a working tool with said workpiece, said apparatus comprising:
   a tool holder for holding said working tool;
   a work holder for holding said workpiece;
   a foaming device including a container for accommodating a working liquid, a porous member disposed below a surface of said working liquid within said container, and a device for blowing a gas into said container through said porous member, so as to foam said working liquid to produce a mass of bubbles;
   a conduit for delivering said mass of bubbles from said foaming device; and
   a nozzle disposed at one end of said conduit remote from said foaming device, for applying said mass of bubbles to at least one of said working tool and said workpiece.

11. An apparatus for physically processing a workpiece by contact of a working tool with the workpiece, and by application of a mass of bubbles of a working liquid to an area of contact between said working tool and said workpiece, said apparatus comprising:

a bubble generating device including a porous member in contact with a mass of said working liquid, and a gas supply device for supplying a gas to said porous member to generate a mass of bubbles of said working liquid; and an applying device for applying said mass of bubbles from said porous member to said area of contact between said working tool and said workpiece.

12. An apparatus according to claim 11, wherein said bubble generating device comprises a foaming device having a container for accommodating said mass of said working liquid, said porous member disposed in said mass of said working liquid, and wherein said gas supply device includes a device for blowing said gas into said porous member to generate said mass of bubbles of said working liquid.

13. An apparatus according to claim 11, wherein said bubble generating device further includes a foaming nozzle containing said porous member and connected to said gas supply device, said bubble generating device further including a soaking chamber for soaking said porous member with said working liquid, said soaking chamber cooperating with said gas supply device and said porous member to produce said mass of bubbles of said working liquid on one side of said porous member remote from said gas supply device, said foaming nozzle having an output nozzle portion functioning as said applying device.

14. An apparatus according to claim 11, wherein said bubble generating device further includes a liquid supply device for providing a flow of said working liquid, and a foaming head in which said porous member is disposed, said foaming head receiving a flow of said gas from said gas supply device and said flow of said working liquid from said liquid supply device, so that working liquid is foamed within said porous member into said mass of bubbles to be applied to said area of contact between said working tool and said workpiece, said foaming head having an output functioning as said applying device.

15. An apparatus according to claim 14, wherein said foaming head includes a first portion which is disposed upstream of said porous member and which receives said flow of said gas from said gas supply device, and a second portion which is disposed between said porous member and said first portion and which receives said flow of said working liquid from said liquid supply device and said flow of said gas from said first portion, so that a mixture of said gas and said working liquid is introduced from said second portion into said porous member to generate said mass of bubbles of said working liquid.

16. An apparatus according to claim 14, wherein said liquid supply device includes a pressure vessel in which said working liquid is stored under pressure.

17. An apparatus according to claim 16, wherein said gas supply device includes a second pressure vessel in which said gas is stored under pressure, said pressure vessel of said liquid supply device connected to said second pressure vessel to maintain said working liquid under pressure from said gas.

18. An apparatus according to claim 11, wherein said gas is argon.

* * * * *